(12) United States Patent
Vaidyanathan et al.

(10) Patent No.: US 8,253,588 B2
(45) Date of Patent: Aug. 28, 2012

(54) FACILITATING POWER SUPPLY UNIT MANAGEMENT USING TELEMETRY DATA ANALYSIS

(75) Inventors: Kalyanaraman Vaidyanathan, San Diego, CA (US); Kenny C. Gross, San Diego, CA (US)

(73) Assignee: Oracle America, Inc., Redwood Shores, CA (US)

(*) Notice: Subject to any disclaimer, the term of this patent is extended or adjusted under 35 U.S.C. 154(b) by 467 days.

(21) Appl. No.: 12/611,008

(22) Filed: Nov. 2, 2009

(65) Prior Publication Data

US 2011/0102190 A1    May 5, 2011

(51) Int. Cl.
*G08C 19/16*    (2006.01)
(52) U.S. Cl. ............ 340/870.17; 713/340; 718/105; 73/660; 73/650; 73/593
(58) Field of Classification Search ........... 340/870.17; 713/340; 73/660, 650, 593; 718/105
See application file for complete search history.

(56) References Cited

U.S. PATENT DOCUMENTS

| | | | |
|---|---|---|---|
| 7,861,593 B2* | 1/2011 | Bougaev et al. | 73/660 |
| 8,041,963 B2* | 10/2011 | Gross et al. | 713/300 |
| 2010/0037078 A1* | 2/2010 | Gross et al. | 713/340 |
| 2010/0332185 A1* | 12/2010 | Haag et al. | 702/179 |
| 2011/0258157 A1* | 10/2011 | Vaidyanathan et al. | 706/54 |

* cited by examiner

*Primary Examiner* — Lam T Mai
(74) *Attorney, Agent, or Firm* — Park, Vaughan, Fleming & Dowler LLP; Chia-Hsin Suen

(57) ABSTRACT

Some embodiments provide a system that analyzes telemetry data from a computer system. During operation, the system obtains the telemetry data as a set of telemetric signals from the computer system and validates the telemetric signals using a nonlinear, nonparametric regression technique. Next, the system assesses the integrity of a power supply unit (PSU) in the computer system by comparing the telemetric signals to one or more reference telemetric signals associated with the computer system. If the assessed integrity falls below a threshold, the system performs a remedial action for the computer system.

20 Claims, 5 Drawing Sheets

FACILITATING POWER SUPPLY UNIT MANAGEMENT USING TELEMETRY DATA ANALYSIS

BACKGROUND

1. Field

The present embodiments relate to techniques for monitoring and analyzing computer systems. More specifically, the present embodiments relate to a method and system for detecting and managing power supply unit degradation in a computer system by analyzing telemetry data from the computer system.

2. Related Art

As electronic commerce becomes more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is important to ensure high availability in such enterprise computing systems.

To achieve high availability, it is necessary to be able to capture unambiguous diagnostic information that can quickly locate faults in hardware or software. If systems perform too little event monitoring, when a problem crops up at a customer site, service engineers may be unable to quickly identify the source of the problem, which in turn may lead to increased down time.

In particular, power supply units (PSUs) for high-end computer servers are typically manufactured by power supply vendors instead of by server manufacturers. Such commodity PSUs may lack internal diagnostics and/or sensors that report fan failures caused by gradual degradation in bearings, lubrication, mechanical parts, and/or fan motors in the PSUs. Because fan failures in commodity PSUs may go unnoticed, the PSUs may continue operating without the fans until temperature increases in the PSUs and/or server components result in server shutdowns and/or other failures. For example, a fan failure in a PSU within a server may cause both the PSU and a set of processors in the server to heat up until the server is shut down by a thermal trip.

Furthermore, techniques for replacing degraded PSUs in servers are frequently associated with manual investigation and/or unnecessary costs. For example, a technician may find a degraded PSU in a data center by holding a tissue next to air vents in PSUs and identifying the air vent that does not produce airflow. Similarly, a worldwide recall of PSUs may require that all PSUs for a particular platform be replaced, even if only a fraction of the PSUs is expected to fail.

Hence, what is needed is a mechanism for identifying and detecting degraded PSUs before failures result from the degradation.

SUMMARY

Some embodiments provide a system that analyzes telemetry data from a computer system. During operation, the system obtains the telemetry data as a set of telemetric signals from the computer system and validates the telemetric signals using a nonlinear, nonparametric regression technique. Next, the system assesses the integrity of a power supply unit (PSU) in the computer system by comparing the telemetric signals to one or more reference telemetric signals associated with the computer system. If the assessed integrity falls below a threshold, the system performs a remedial action for the computer system.

In some embodiments, the telemetric signals include temperature signals and fan speed signals.

In some embodiments, validating the telemetric signals involves verifying the operability of a set of temperature sensors in the computer system using the temperature signals and the fan speed signals.

In some embodiments, the system also dequantizes the temperature signals prior to validating the telemetric signals and normalizes the temperature signals after validating the telemetric signals.

In some embodiments, normalizing the temperature signals involves obtaining an ambient temperature signal associated with the computer system and subtracting the ambient temperature signal from each of the temperature signals.

In some embodiments, the ambient temperature signal is obtained using at least one of a temperature sensor and an average of the temperature signals.

In some embodiments, assessing the integrity of the PSU involves identifying a degradation risk associated with the PSU if a subset of the normalized temperature signals associated with the PSU is above a reference temperature value, and verifying the integrity of the PSU if one or more of the subset of the normalized temperature signals is below the reference temperature value.

In some embodiments, performing the remedial action for the computer system involves notifying a technician of the degradation risk.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
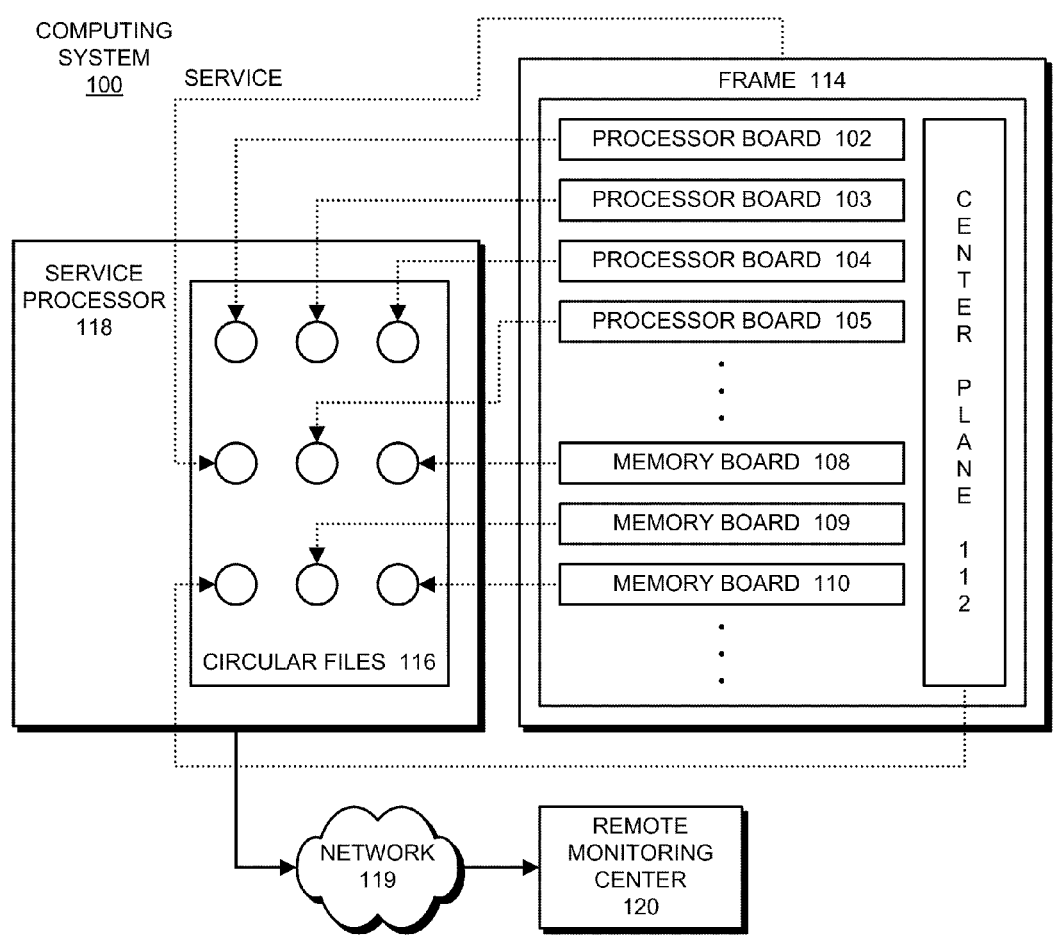
FIG. 1 shows a computer system which includes a service processor for processing telemetry signals in accordance with an embodiment.

FIG. 1 shows a computer system which includes a service processor for processing telemetry signals in accordance with an embodiment. As is illustrated in FIG. 1, computer system 100 includes a number of processor boards 102-105 and a number of memory boards 108-110, which communicate with each other through center plane 112. These system components are all housed within a frame 114.

In one or more embodiments, these system components and frame 114 are all "field-replaceable units" (FRUs), which are independently monitored as is described below. Note that all major system units, including both hardware and software, can be decomposed into FRUs. For example, a software FRU can include an operating system, a middleware component, a database, or an application.

Computer system 100 is associated with a service processor 118, which can be located within computer system 100, or alternatively can be located in a standalone unit separate from computer system 100. For example, service processor 118 may correspond to a portable computing device, such as a mobile phone, laptop computer, personal digital assistant (PDA), and/or portable media player. Service processor 118 may include a monitoring mechanism that performs a number of diagnostic functions for computer system 100. One of these diagnostic functions involves recording performance parameters from the various FRUs within computer system 100 into a set of circular files 116 located within service processor 118. In one embodiment of the present invention, the performance parameters are recorded from telemetry signals generated from hardware sensors and software monitors within computer system 100. In one or more embodiments, a dedicated circular file is created and used for each FRU within computer system 100. Note that this circular file can have a three-stage structure as is described below with reference to FIG. 2.

The contents of one or more of these circular files 116 can be transferred across network 119 to remote monitoring center 120 for diagnostic purposes. Network 119 can generally include any type of wired or wireless communication channel capable of coupling together computing nodes. This includes, but is not limited to, a local area network (LAN), a wide area network (WAN), a wireless network, and/or a combination of networks. In one or more embodiments, network 119 includes the Internet. Upon receiving one or more circular files 116, remote monitoring center 120 may perform various diagnostic functions on computer system 100, as described below with respect to FIGS. 2-3. The system of FIG. 1 is described further in U.S. Pat. No. 7,020,802 (issued Mar. 28, 2006), by inventors Kenny C. Gross and Larry G. Votta, Jr., entitled "Method and Apparatus for Monitoring and Recording Computer System Performance Parameters," which is incorporated herein by reference.

Figure 2:
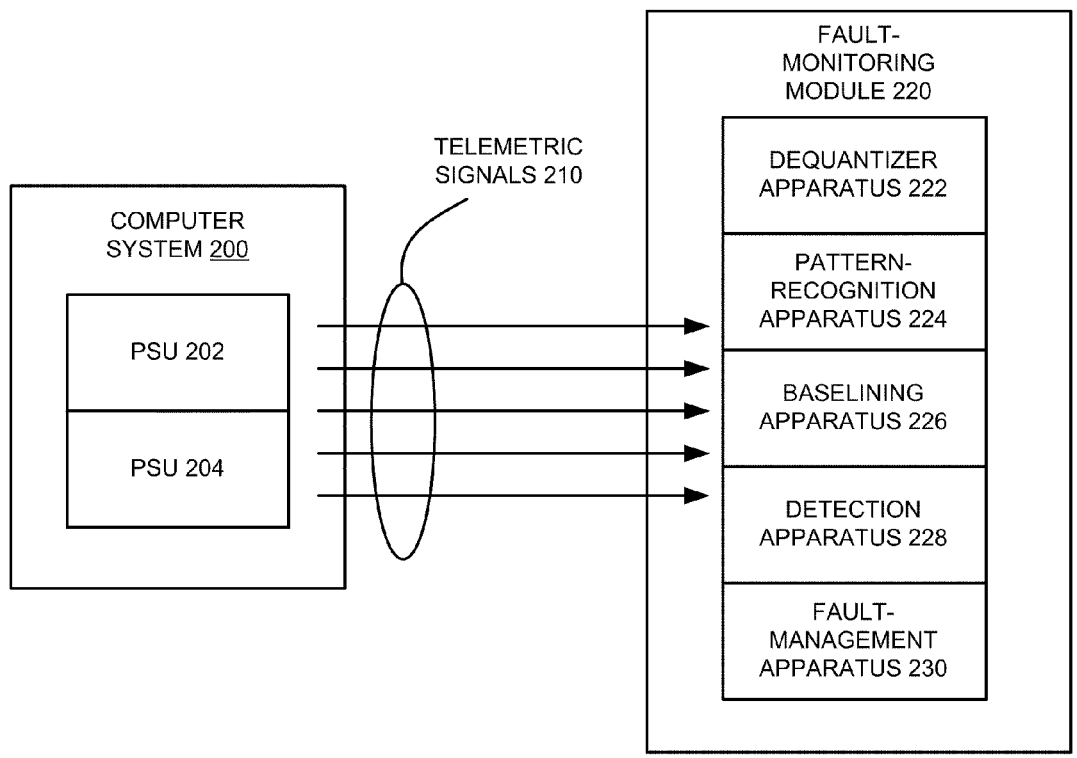
FIG. 2 shows a telemetry analysis system which examines both short-term real-time telemetry data and long-term historical telemetry data in accordance with an embodiment.

FIG. 2 shows a telemetry analysis system which examines both short-term real-time telemetry data and long-term historical telemetry data in accordance with an embodiment. In this example, a computer system 200 is monitored using a number of telemetric signals 210, which are transmitted to a fault-monitoring module 220. Fault-monitoring module 220 analyzes telemetric signals 210 and issues alerts when there is an anomaly.

Fault-monitoring module 220 may be provided by and/or implemented using a service processor associated with computer system 200. Alternatively, fault-monitoring module 220 may reside within a remote monitoring center (e.g., remote monitoring center 120 of FIG. 1) that obtains telemetric signals 210 from computer system 200 over a network connection. Moreover, fault-monitoring module 220 may include functionality to analyze both real-time telemetric signals 210 and long-term historical telemetry data. For example, fault-monitoring module 220 may be used to detect anomalies in telemetric signals 210 received directly from the monitored computer system(s). Fault-monitoring module 220 may also be used in offline detection of anomalies from the monitored computer system(s) by processing archived and/or compressed telemetry data associated with the monitored computer system(s).

In one or more embodiments, fault-monitoring module 220 includes functionality to detect and manage degradation in a set of power supply units (PSUs) 202-204 within computer system 200. To monitor PSUs 202-204 for degradation, fault-monitoring module 220 may obtain telemetric signals 210 that include temperature signals and fan speed signals using sensors in computer system 200. Because PSUs 202-204 may lack sensors and/or other internal diagnostics, the temperature signals and fan speed signals may be measured from sensors associated with other components in computer system 200. For example, the temperature signals may be measured from processors in computer system 200, while the fan speed signals may be measured from system fans in computer system 200.

Furthermore, a number of components in fault-monitoring module 220 may process and/or analyze telemetric signals 210. In particular, a dequantizer apparatus 222 may remove quantization effects associated with low-resolution (e.g., 8-bit) analog-to-digital (A/D) conversion of high-resolution signals (e.g., telemetric signals 210). Such quantization effects may produce inaccuracies during the analysis of telemetric signals 210 and may prevent fault-monitoring module 220 from detecting subtle anomalies that precede faults or failures in computer system 200. The functionality of dequantizer apparatus 222 is described in U.S. Pat. No. 7,248,980 (issued Jul. 24, 2007), by inventors Kenny C. Gross, Ramakrishna C. Dhanekula, Eugenio J. Schuster, and Gregory A. Cumberford, entitled "Method and Apparatus for Removing Quantization Effects in a Quantization Signal," which is incorporated herein by reference.

Next, a pattern-recognition apparatus 224 in fault-monitoring module 220 may validate telemetric signals 210 using a nonlinear, nonparametric regression technique. The validation may examine the temperature and fan speed signals to verify that temperature sensors in computer system 200 are operable. For example, pattern-recognition apparatus 224 may verify that the temperature sensors have not degraded and/or drifted out of calibration using the temperature and fan speed signals.

In one or more embodiments, the nonlinear, nonparametric regression technique used by pattern-recognition apparatus 224 corresponds to a multivariate state estimation technique (MSET). Pattern-recognition apparatus 224 may be trained using telemetry data from similar computer systems with all possible combinations of degraded and undegraded PSUs in all possible slots within the computer systems. For example, if computer system 200 contains two PSUs 202-204, pattern-recognition apparatus 224 may be trained using telemetry data from a computer system that contains two undegraded PSUs, two computer systems that each contain one degraded PSU corresponding respectively to PSU 202 and PSU 204, and a computer system that contains two degraded PSUs.

To validate telemetric signals 210 using MSET, pattern-recognition apparatus 224 generate estimates of telemetric signals 210 based on the current set of telemetric signals 210. Pattern-recognition apparatus 224 may then obtain residuals by subtracting the estimated telemetric signals from the measured telemetric signals 210. The residuals may represent the deviation of computer system 200 from known operating configurations of computer system 200. As a result, pattern-recognition apparatus 224 may validate telemetric signals 210 by analyzing the residuals over time, with changes in the residuals representing degradation and/or decalibration drift in the sensors.

For example, pattern-recognition apparatus 224 may use MSET to generate, from telemetric signals 210, four sets of estimated telemetric signals representing the four possible configurations of degraded and undegraded PSUs 202-204 in computer system 200. Pattern-recognition apparatus may also calculate four sets of residuals by subtracting telemetric signals 210 from each set of estimated telemetric signals. Because telemetric signals 210 should correspond to one of the four possible PSU configurations in computer system 200, one set of residuals should be consistent with normal signal behavior in the corresponding PSU configuration (e.g., normally distributed with a mean of 0). On the other hand, the other three sets of residuals may indicate abnormal signal behavior (e.g., nonzero mean, higher or lower variance, etc.) because telemetric signals 210 do not match the estimated (e.g., characteristic) telemetric signals for the remaining three PSU configurations. Moreover, if abnormal signal behavior is found in all four sets of residuals, degradation and/or decalibration drift may be present in one or more sensors. Consequently, telemetric signals 210 may be valid if one set of residuals represents normal signal behavior and invalid if none of the residuals represents normal signal behavior.

In one or more embodiments, the nonlinear, nonparametric regression technique used in pattern-recognition apparatus 224 may refer to any number of pattern-recognition algorithms. For example, see [Gribok] "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington D.C., Nov. 13-17, 2000. This paper outlines several different pattern-recognition approaches. Hence, the term "MSET" as used in this specification can refer to (among other things) any 25 techniques outlined in [Gribok], including Ordinary Least Squares (OLS), Support Vector Machines (SVM), Artificial Neural Networks (ANNs), MSET, or Regularized MSET (RMSET).

After the temperature and fan speed signals are validated, a baselining apparatus 226 in fault-monitoring module 220 may normalize the temperature signals by removing ambient temperature effects associated with the temperature signals. For example, ambient temperature effects may be caused by temperature changes in the data center in which computer system 200 is housed and/or by relocating computer system 200 within the data center. To remove the ambient temperature effects, baselining apparatus 226 may obtain an ambient temperature signal associated with computer system 200 and subtract the ambient temperature signal from temperature signals in telemetric signals 210. Furthermore, the ambient temperature signal may be obtained using one or more sensors that measure the ambient temperature around computer system 200, or as an average of the temperature signals obtained from computer system 200 and/or other computer systems near computer system 200.

A detection apparatus 228 in fault-monitoring module 220 may then assess the integrity of PSUs 202-204 by comparing telemetric signals 210 to one or more reference telemetric signals associated with computer system 200. More specifically, detection apparatus 228 may verify the integrity of a PSU if normalized temperature signals associated with the PSU are below a reference temperature value. On the other hand, detection apparatus 228 may identify a degradation risk associated with the PSU if the normalized temperature signals are above the reference temperature value. For example, temperature signals may be obtained from four processors in computer system 200. Pattern-recognition apparatus 224 may identify a correlation between temperature signals from the first two processors and the integrity of PSU 202, as well as a correlation between temperature signals from the last two processors and the integrity of PSU 204. As a result, detection apparatus 228 may assess the integrity of PSU 202 by comparing temperature signals from the first two processors with a reference temperature value obtained from pattern-recognition apparatus 224. Detection apparatus 228 may then assess the integrity of PSU 204 by comparing temperature signals from the last two processors with the reference temperature value.

Degradation found in one or more PSUs 202-204 by detection apparatus 228 may then be managed by a fault-management apparatus 230 in fault-monitoring module 220. Fault-management apparatus 230 may perform a remedial action for computer system 200 to facilitate the management of a degrading PSU 202-204. For example, fault-management apparatus 230 may enable a technician to quickly replace the degrading PSU by notifying the technician of the type and location of the PSU within computer system 200.

Fault-management apparatus 230 may also include functionality to manage faulty sensors in computer system 200. As mentioned previously, the faulty sensors may be identified by pattern-recognition apparatus 224 during validation of telemetric signals 210. Spurious signal values obtained from the faulty sensors may impede the normal operation of computer system 200. As a result, fault-management apparatus 230 may generate replacement signals in lieu of the sensors' faulty signals to maintain normal operation in computer system 200. For example, if a faulty temperature sensor in computer system 200 is causing system fans to continuously cycle between low and high speeds, fault-management apparatus 230 may generate a series of replacement temperature values to maintain normal fan speeds in computer system 200 prior to the replacement of the faulty temperature sensor. Fault-management apparatus 230 may also facilitate the replacement of faulty sensors during a scheduled outage of computer system 200 by identifying and locating the faulty sensors.

Consequently, fault-monitoring module 220 may allow degradation in PSUs 202-204 to be detected despite a potential lack of sensors and/or internal diagnostics in PSUs 202-204. Early detection and identification of degradation in PSUs 202-204 may further allow preventive maintenance to be performed on computer system 200 prior to the occurrence of failures that reduce availability and increase maintenance costs in computer system 200. For example, identification of a degradation risk in PSU 202 may allow PSU 202 to be replaced before PSU 202 fails and/or computer system 200 shuts down. Fault-monitoring module 220 may also reduce costs associated with a recall of PSUs 202-204 by enabling the selective replacement of faulty PSUs targeted by the recall instead of a wholesale replacement of all PSUs for a platform associated with the recall.

Those skilled in the art will appreciate that fault-monitoring module 220 may be used to detect degradation in components and systems outside of PSUs 202-204 and computer system 200. For example, fault-monitoring module 220 may be used to detect and manage degradation in redundant power supplies, processors, fan modules, and/or other components in computer system 200 that generate heat and/or use cooling fans. Fault-monitoring module 220 may additionally be used to monitor components in medical electronic devices, military electronics systems, avionics electronics systems, and/or other types of systems with electronic components.

Figure 3A:
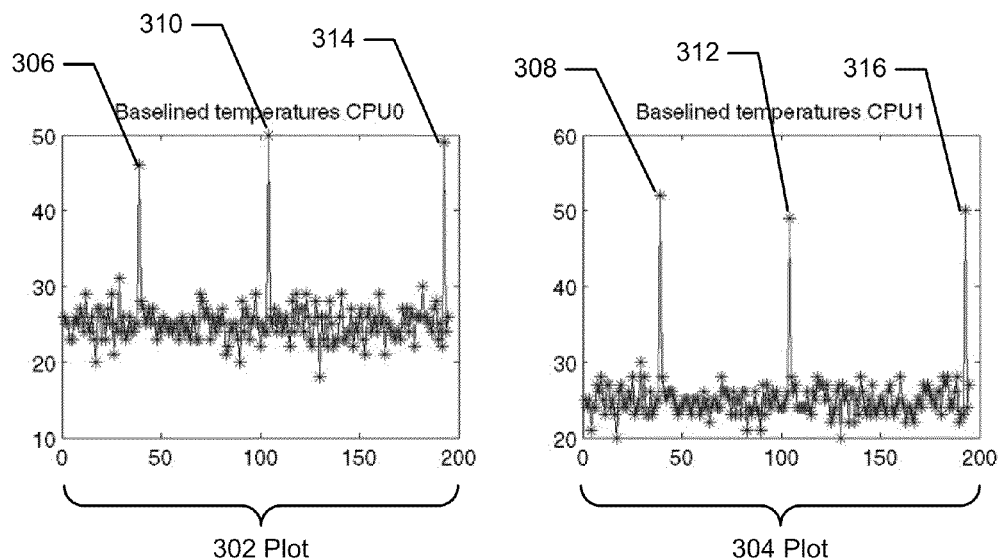
FIG. 3A shows an exemplary set of plots in accordance with an embodiment.

FIG. 3A shows an exemplary set of plots 302-304 in accordance with an embodiment. More specifically, FIG. 3A shows plots 302-304 of temperature signals from 195 computer systems, with the temperatures in Celsius plotted as a function of numbers corresponding to the computer systems (e.g., #1 to #195). Plot 302 contains temperature signals from a "CPU0" processor in each computer system, while plot 304 contains temperature signals from a "CPU1" processor in each computer system. Temperature signals from the "CPU0" and "CPU1" processors may be used to detect degradation in a particular PSU within each computer system. In other words, a correlation may exist between temperature readings of "CPU0" and "CPU1" and the integrity of the PSU.

Furthermore, plots 302-304 may show normalized temperature signals from the computer systems. As discussed above, the normalized temperature signals may be obtained by subtracting an ambient temperature signal from each of the temperature signals. Normalization of the temperature signals may prevent temperature changes in the vicinity of each computer system from affecting the analysis of the temperature signals.

As shown in FIG. 3A, plots 302-304 contain six temperature signals 306-316 that are significantly higher than temperature signals from other computer systems. Temperature signals 306-316 may indicate degradation in PSUs within the corresponding computer systems. For example, temperature signals 306-308 may indicate PSU degradation within computer system #39, signals 310-312 may indicate PSU degradation within computer system #104, and signals 314-316 may indicate PSU degradation within computer system #193.

As described above, PSU degradation may be found when temperature signals associated with a PSU are above a reference temperature value. The reference temperature value may correspond to an average or median temperature signal of the 195 temperature signals in each plot 302-304. Alternatively, the reference temperature value may be provided by a nonlinear, nonparametric regression technique such as MSET. Moreover, all temperature signals associated with a given PSU must exceed the reference temperature value for degradation to be found in the PSU. Because computer systems #39, #104, and #193 include temperature signals 306-316 for both "CPU0" and "CPU1" that are far higher than the temperature signals from all other computer systems, PSU degradation may be found within computer systems #39, #104, and #193. However, if a temperature signal for a computer system were elevated in only one plot 302-304, no degradation would be found. For example, computer system #39 would not contain a degraded PSU if temperature signal 308 had a value of 30 degrees.

Figure 3B:
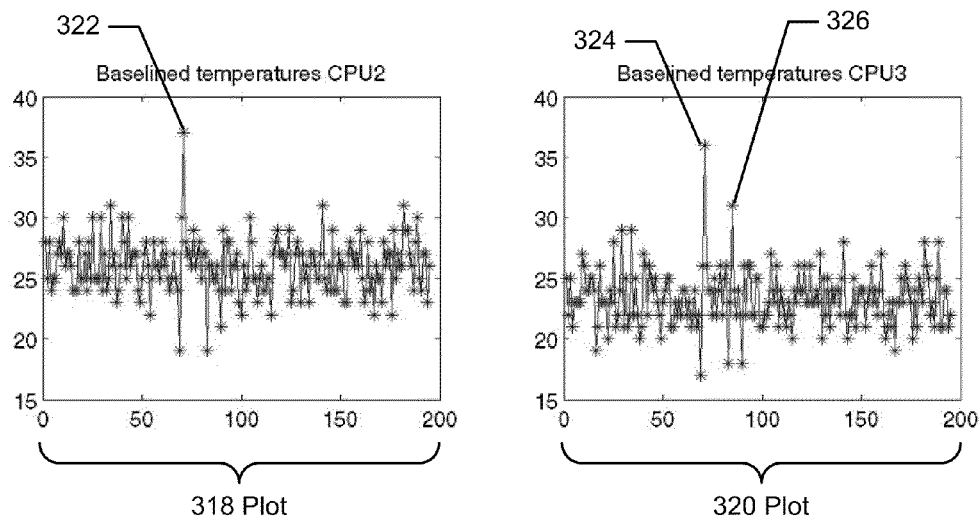
FIG. 3B shows an exemplary set of plots in accordance with an embodiment.

FIG. 3B shows an exemplary set of plots 318-320 in accordance with an embodiment. As with plots 302-304 in FIG. 3A, plots 318-320 contain temperature signals from 195 computer systems. Plot 318 contains temperature signals from a processor designated "CPU2," and plot 320 contains temperature signals from a processor designated "CPU3." As a result, plots 302-304 and 318-320 may show temperature signals from four separate processors (e.g., "CPU0," "CPU1," "CPU2," "CPU3") within each of 195 computer systems.

Furthermore, plots 318-320 may be used to detect degradation in a different PSU from that of plots 302-304. For example, each computer system may include two PSUs in slots "PS0" and "PS1." Degradation in "PS0" may be determined by analyzing temperature signals from "CPU0" and "CPU1," while degradation in "PS1" may be assessed by analyzing temperature signals from "CPU2" and "CPU3."

As shown in FIG. 3B, plots 318-320 contain three temperature signals 322-326 that are higher than temperature signals from other computer systems. Temperature signals 322-324 may indicate that computer system #71 contains a degraded PSU in the "PS1" slot. However, because temperature signal 326 does not have an accompanying elevated temperature signal in plot 318, no degradation may be found in the "PS1" slot of computer system #85. In other words, impedance patterns associated with degradation of a specific PSU in a computer system may affect multiple processors in the computer system. Consequently, the impedance pattern, and hence degradation in the PSU, may be found in the computer system only if all processors correlated with the degradation exhibit elevated temperatures.

Figure 4:
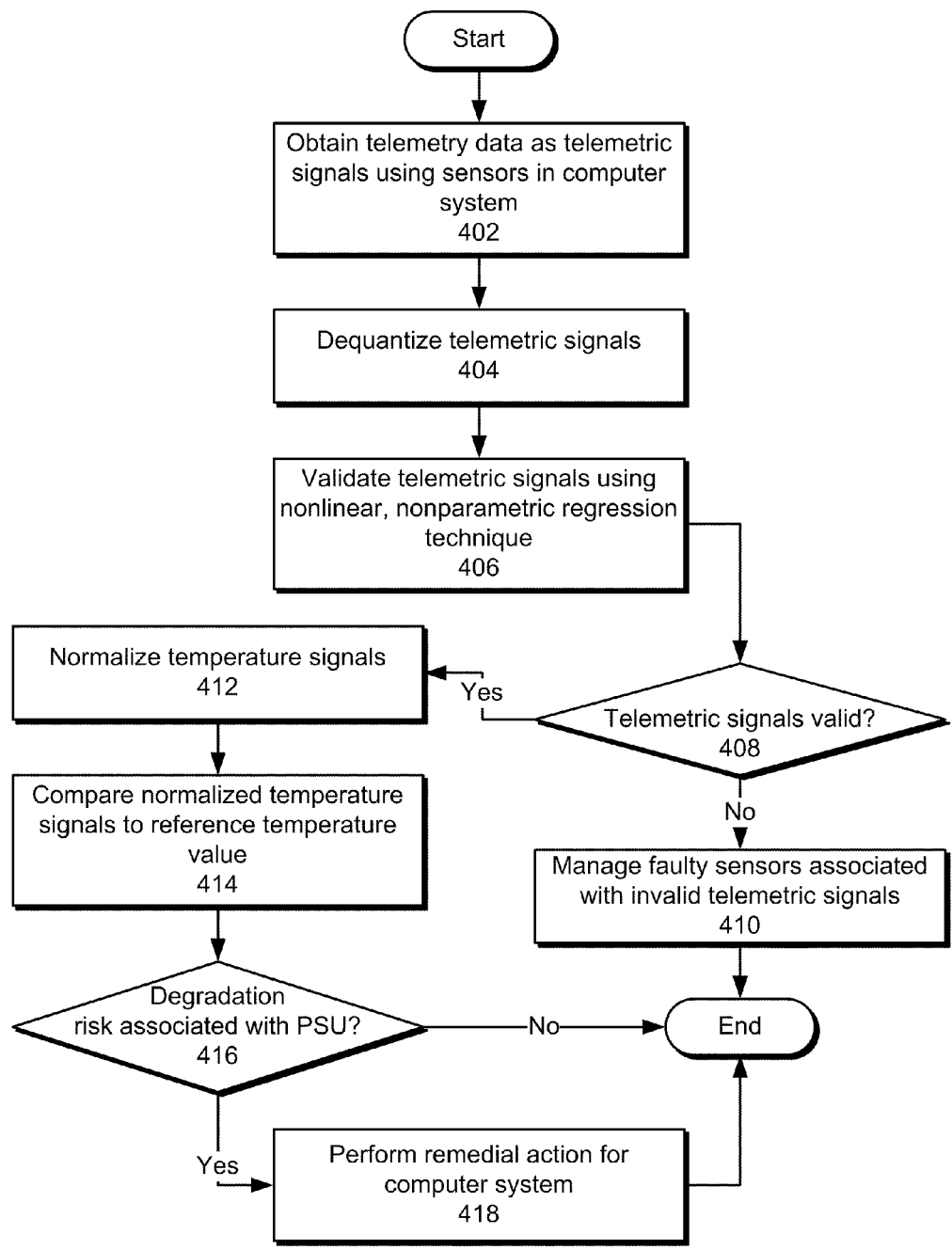
FIG. 4 shows a flowchart illustrating the process of analyzing telemetry data from a computer system in accordance with an embodiment.

FIG. 4 shows a flowchart illustrating the process of analyzing telemetry data from a computer system in accordance with an embodiment. In one or more embodiments, one or more of the steps may be omitted, repeated, and/or performed in a different order. Accordingly, the specific arrangement of steps shown in FIG. 4 should not be construed as limiting the scope of the technique.

First, the telemetry data is obtained as a set of telemetric signals using a set of sensors in the computer system (operation 402). The telemetric signals may include temperature signals and fan speed signals. Next, the telemetric signals are dequantized (operation 404) to increase the resolution of the telemetric signals. The telemetric signals are then validated using a nonlinear, nonparametric regression technique (operation 406). For example, the temperature and fan speed signals may be processed using MSET to verify the operability of a set of temperature sensors in the computer system.

Analysis of the telemetric signals may proceed based on the validity of the telemetric signals (operation 408). If the telemetric signals are invalid, a set of faulty sensors associated with the invalid telemetric signals is managed (operation 410). For example, if a faulty temperature sensor in is causing fans to continuously cycle between low and high speeds, a series of replacement temperature values may be generated to maintain normal fan speeds prior to the replacement of the faulty temperature sensor. The replacement of the faulty sensors may also be facilitated by notifying a technician of the faulty sensors.

If the telemetric signals are valid, the temperature signals are normalized (operation 412) to remove ambient temperature effects from the temperature signals. To normalize the temperature signals, an ambient temperature signal may be obtained and subtracted from each of the temperature signals. The ambient temperature signal may be obtained using a temperature sensor and/or as an average of the temperature signals.

The integrity of a PSU in the computer system may then be assessed by comparing the telemetric signals to one or more reference telemetric signals associated with the computer system. In particular, a subset of the normalized temperature signals associated (e.g., correlated) with the PSU may be compared to a reference temperature value (operation 414) to determine a degradation risk associated with the PSU (operation 416). For example, two temperature signals from processors affected by degradation in the PSU may be compared to the reference temperature value to determine if the degradation risk exists. The reference temperature value may be obtained using the nonlinear, nonparametric regression technique and/or based on a statistic (e.g., mean, median, etc.) or historical value associated with the temperature signals.

If the subset of normalized temperature signals is above the reference temperature value, a degradation risk is found and a remedial action is performed for the computer system (operation 418). The remedial action may facilitate the management of the degrading PSU. For example, a service processor in the computer system may perform the remedial action by notifying a technician of the degradation risk and providing information that allows the technician to locate the PSU. On the other hand, if any of the subset of normalized temperature signals is below the reference temperature value, no degradation is found and no action needs to be taken.

Figure 5:
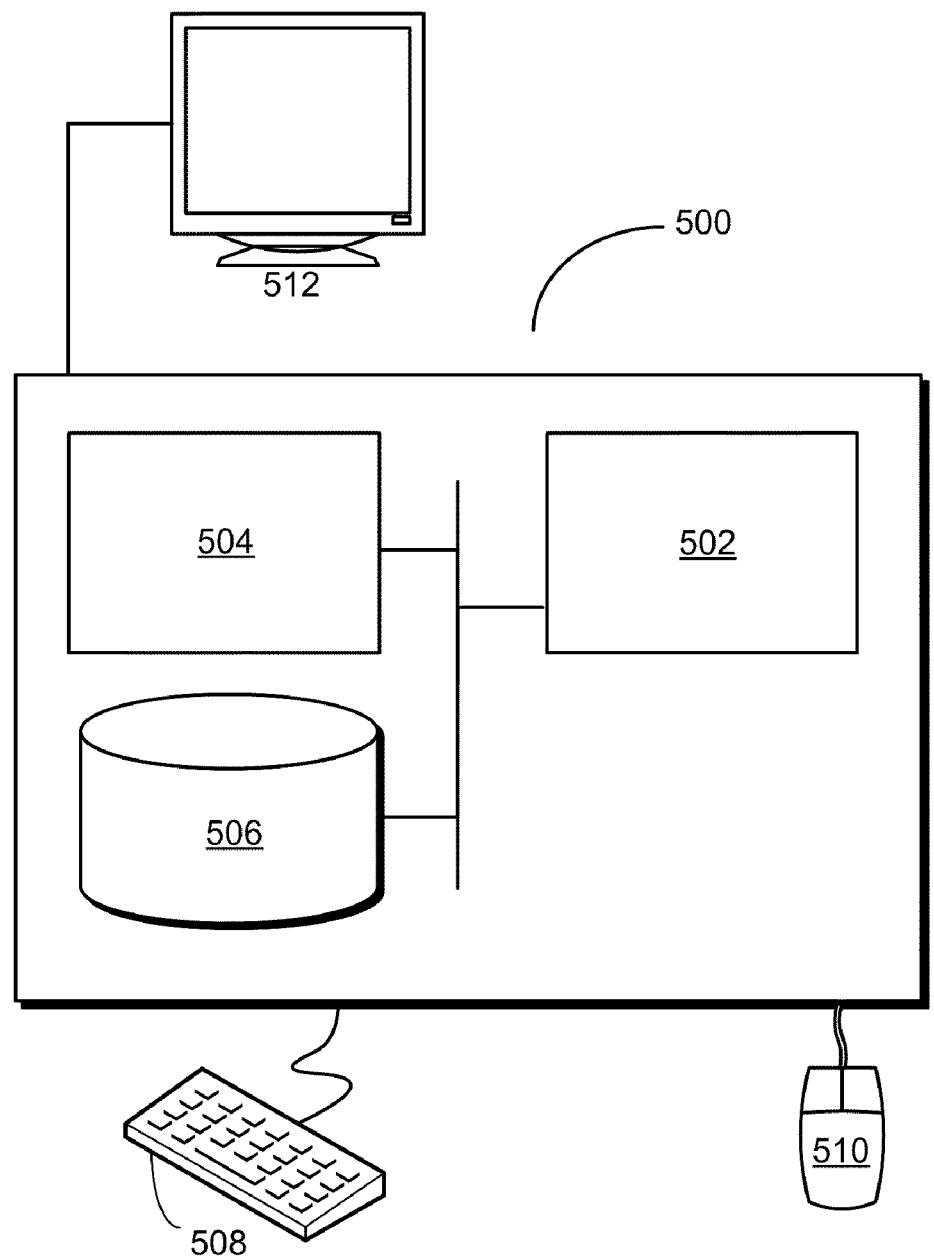
FIG. 5 shows a computer system in accordance with an embodiment.

FIG. 5 shows a computer system 500. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In particular, computer system 500 may implement a fault-monitoring module that analyzes telemetry data from a monitored system. The fault-monitoring module may include a dequantizer apparatus that dequantizes a set of telemetric signals from the monitored system. The telemetric signals may include fan speed signals and temperature signals. The fault-monitoring module may also include a pattern-recognition apparatus that validates the telemetric signals using a nonlinear, nonparametric regression technique. A baselining apparatus in the fault-monitoring module may normalize the temperature signals, and a detection apparatus in the fault-monitoring module may assess the integrity of the monitored system by comparing the normalized temperature signals to a reference temperature value. Finally, the fault-monitoring module may include a fault-management apparatus that performs a remedial action for the computer system if the assessed integrity falls below a threshold.

In addition, one or more components of computer system 500 may be remotely located and connected to the other components over a network. Portions of the present embodiments (e.g., monitoring mechanism, fault-monitoring module, dequantizer apparatus, pattern-recognition apparatus, baselining apparatus, detection apparatus, fault-management apparatus, etc.) may also be located on different nodes of a distributed system that implements the embodiments. For example, the present embodiments may be implemented using a cloud computing system that provides a remote monitoring and analysis framework for a set of computer servers, avionics electronics systems, and/or medical electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for analyzing telemetry data from a computer system, comprising:
    obtaining the telemetry data as a set of telemetric signals using a set of sensors in the computer system;
    validating the telemetric signals using a nonlinear, nonparametric regression technique;
    assessing an integrity of a power supply unit (PSU) in the computer system by comparing the telemetric signals to one or more reference telemetric signals associated with the computer system; and
    if the assessed integrity falls below a threshold, performing a remedial action for the computer system using a service processor in the computer system.

2. The computer-implemented method of claim 1, wherein the telemetric signals comprise temperature signals and fan speed signals.

3. The computer-implemented method of claim 2, wherein validating the telemetric signals involves:
    verifying the operability of a set of temperature sensors in the computer system using the temperature signals and the fan speed signals.

4. The computer-implemented method of claim 3, further comprising:
    dequantizing the temperature signals prior to validating the telemetric signals; and
    normalizing the temperature signals after validating the telemetric signals.

5. The computer-implemented method of claim 4, wherein normalizing the temperature signals involves:
    obtaining an ambient temperature signal associated with the computer system; and
    subtracting the ambient temperature signal from each of the temperature signals.

6. The computer-implemented method of claim 5, wherein the ambient temperature signal is obtained using at least one of a temperature sensor and an average of the temperature signals.

7. The computer-implemented method of claim 4, wherein assessing the integrity of the PSU involves:

identifying a degradation risk associated with the PSU if a subset of the normalized temperature signals associated with the PSU is above a reference temperature value; and verifying the integrity of the PSU if one or more of the subset of the normalized temperature signals is below the reference temperature value.

8. The computer-implemented method of claim 7, wherein performing the remedial action for the computer system involves:

notifying a technician of the degradation risk.

9. A system for analyzing telemetry data from a computer system, comprising:

a monitoring mechanism configured to obtain the telemetry data as a set of telemetric signals using a set of sensors in the computer system; and a fault-monitoring module configured to:
validate the telemetric signals using a nonlinear, non-parametric regression technique;
assess an integrity of a power supply unit (PSU) in the computer system by comparing the telemetric signals to a set of reference telemetric signals associated with the computer system; and
if the assessed integrity falls below a threshold, performing a remedial action for the computer system.

10. The system of claim 9, wherein the telemetric signals comprise temperature signals and fan speed signals.

11. The system of claim 10, wherein validating the telemetric signals involves:

verifying the operability of a set of temperature sensors in the computer system using the temperature signals and the fan speed signals.

12. The system of claim 11, further comprising:

a dequantizer apparatus configured to dequantize the temperature signals prior to validating the telemetric signals; and a baselining apparatus configured to normalize the temperature signals after validating the telemetric signals.

13. The system of claim 12, wherein normalizing the temperature signals involves:

obtaining an ambient temperature signal associated with the computer system; and subtracting the ambient temperature signal from each of the temperature signals.

14. The system of claim 12, wherein assessing the integrity of the PSU involves:

identifying a degradation risk associated with the PSU if a subset of the normalized temperature signals associated with the PSU is above a reference temperature value; and verifying the integrity of the PSU if one or more of the subset of the normalized temperature signals is below the reference temperature value.

15. The system of claim 14, wherein performing the remedial action for the computer system involves:

notifying a technician of the degradation risk.

16. A computer-readable storage medium storing instructions that when executed by a computer cause the computer to perform a method for analyzing telemetry data from a computer system, the method comprising:

obtaining the telemetry data as a set of telemetric signals using a set of sensors in the computer system;

validating the telemetric signals using a nonlinear, non-parametric regression technique;

assessing an integrity of a power supply unit (PSU) in the computer system by comparing the telemetric signals to one or more reference telemetric signals associated with the computer system; and if the assessed integrity falls below a threshold, performing a remedial action for the computer system using a service processor in the computer system.

17. The computer-readable storage medium of claim 16, wherein the telemetric signals comprise temperature signals and fan speed signals.

18. The computer-readable storage medium of claim 17, wherein validating the telemetric signals involves:

verifying the operability of a set of temperature sensors in the computer system using the temperature signals and the fan speed signals.

19. The computer-readable storage medium of claim 18, the method further comprising:

dequantizing the temperature signals prior to validating the telemetric signals; and normalizing the temperature signals after validating the telemetric signals.

20. The computer-readable storage medium of claim 19, wherein assessing the integrity of the PSU involves:

identifying a degradation risk associated with the PSU if a subset of the normalized temperature signals associated with the PSU is above a reference temperature value; and verifying the integrity of the PSU if one or more of the subset of the normalized temperature signals is below the reference temperature value.

\* \* \* \* \*